W. J. WOHLENBERG.
COMBINATION THRUST BEARING AND FLUID SEAL.
APPLICATION FILED JAN. 15, 1914.
1,122,051.  Patented Dec. 22, 1914.
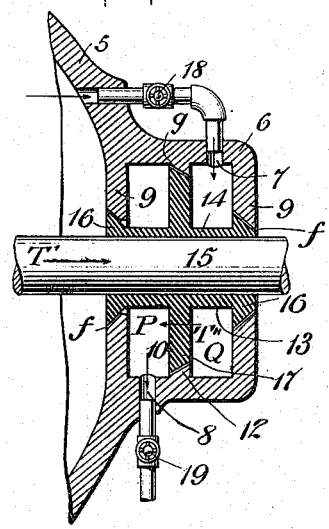
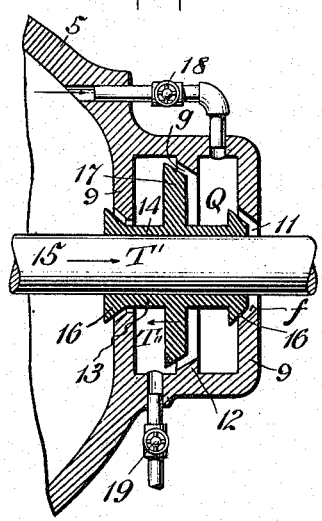
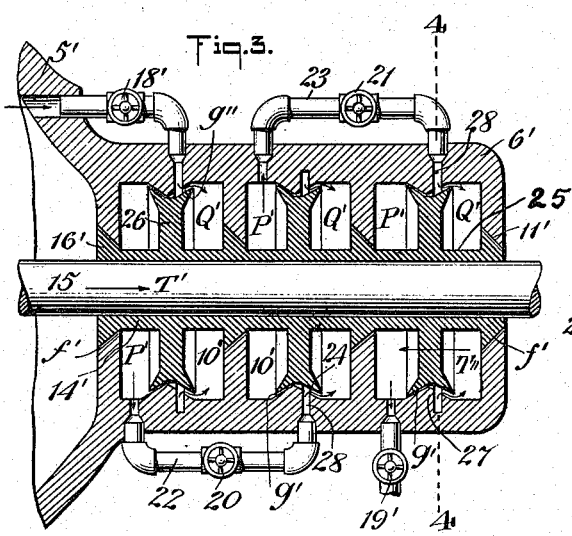
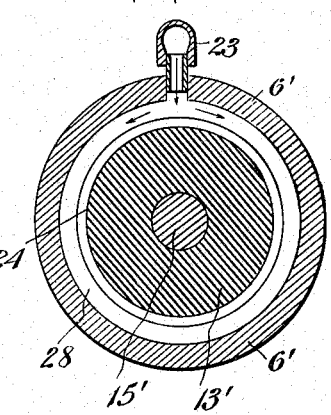
INVENTOR
Walter Jacob Wohlenberg

UNITED STATES PATENT OFFICE.

WALTER JACOB WOHLENBERG, OF URBANA, ILLINOIS.

COMBINATION THRUST-BEARING AND FLUID SEAL.

1,122,051.  Specification of Letters Patent.  Patented Dec. 22, 1914.

Application filed January 15, 1914. Serial No. 812,263.

*To all whom it may concern:*

Be it known that I, WALTER JACOB WOHLENBERG, a citizen of the United States, and a resident of Urbana, in the county of Champaign and State of Illinois, have invented a new and Improved Combination Thrust-Bearing and Fluid Seal, of which the following is a full, clear, and exact description.

My invention relates to combination thrust bearings and fluid seals.

An object thereof is to provide a simple, efficient and inexpensive thrust bearing and fluid seal combined in which the thrust is balanced by fluid pressure oppositely directed, with means for automatically adjusting the said oppositely directed fluid pressures.

A further object of the invention is to provide a combined thrust bearing and fluid seal wherein the relative position between the rotor and stator is fixed by the fluid pressures oppositely directed.

A still further object of the invention is to provide a thrust member having a multicellular arrangement in which the fluid pressure is caused to gradually decrease in each successive cell. I accomplish this and other objects of my invention by the structure conventionally disclosed in the accompanying drawings in which similar characters of reference indicate corresponding parts in all the views and in which—

Figure 1 is a longitudinal, axial section of an embodiment of my invention; Fig. 2 is a similar view showing the gland displaced under the balancing pressure; Fig. 3 is a longitudinal, axial section of a multicellular structure of my device; and Fig. 4 is a transverse section on line 4—4, Fig. 3.

Before proceeding to a more detailed description of my invention, it must be clearly understood that while in the accompanying drawing the fluid for balancing the pressure is taken from the stator, an entirely independent fluid can be used and of a different nature from the fluid used in the stator.

Referring to the drawings, and more particularly to Figs. 1 and 2, 5 represents the stator casing having an extension 6 forming a fluid chamber 10 having a fluid inlet 7 and a fluid outlet 8 disposed at opposite ends of the chamber and of which the fluid inlet is at the end of the extension further from the casing of the stator. The end walls 9 of the chamber each have a beveled central aperture 11, the bevels of the said apertures in the end walls being parallel to each other. The extension 6 is also provided within the chamber with a central annular flange portion 12, the periphery of which flange is beveled in the same direction as the apertures 11, but the angularity of the bevel on the flange 12 is less than that of the apertures. Rotatably mounted within the chamber 10 is a gland 13 formed of a hub 14 rigidly secured to a shaft 15 and provided at its end with flanges 16 having a beveled periphery adapted to fit snugly into the corresponding beveled apertures 11. A central flange 17, also carried by the hub, has its periphery beveled so as to fit snugly into the flange portion 12 simultaneously when the flanges 16 fit snugly into the apertures 11. The inlet 7 of the chamber 10 is connected by a valve-controlled conduit 18 to the casing of the stator; and the outlet 8 of the chamber 10 is provided with a valve-controlled outlet 19. It will be seen that the inlet and outlet of the chamber are in reality separated by the central flange 17 of the gland. The end thrust T' tends to drive the shaft, and, therefore, the gland carried by it, to a position such as to bring the beveled faces of the gland flanges into contact with the beveled faces of the apertures 11 and the flange portion 12. When driven to this position the chamber 10 is separated into two parts P Q. The end thrust T' is resisted by a thrust T'' (see Fig. 1) caused by the fluid entering the chamber part Q through the valve-controlled conduit 18; and since the chamber part P is continuously exhausted through the valve-controlled outlet 19, the flange 17 being larger than the flange 16, the thrust T'' produced by the fluid pressure in the chamber part Q will be larger than T' and the gland will have a tendency to move in the direction of the arrow indicating the thrust T''', the exaggerated movement of the gland being shown in Fig. 2. The thrusts T' and T'' are balanced by the adjustment of the valves 18 and 19, making the clearance $g$ between the flange 17 and the portion 12 of the chamber 10 as small as possible, and also the clearance space $f$ between the flanges 16 and the apertures 11, thus reducing the leakage between the chambers and the outside to a minimum. In view of the difference of angularity of the bevels of the flanges 16 and 17, the flow through $f$ will be larger than that through $g$, the said difference in angularity at $f$ being great enough to overcome the negative difference in circumferential dimension of the clearance space $g$, the reason for this being obvious.

In the multi-cellular structure of the apparatus shown in Figs. 3 and 4, the same principles are involved; and Fig. 3 shows an apparatus formed of three units so interconnected that between like chamber parts of successive units there is a pressure drop in the contained fluid. This pressure drop from one unit to the next is regulated by means of valves 20 and 21 provided on the conduits 22 and 23 respectively connecting the consecutive units. In this structure the shaft 15 carries a gland 25 of which the hub 14' is provided with a series of flanges 16' intermediate which flanges other flanges 26 are provided. The consecutive chambers 10' of the extension 6' are each provided with beveled central openings 11' engaged by the flanges 16', similar to what has been described for Figs. 1 and 2. Each of the flanges 26 on the periphery thereof is provided with a V-shaped groove 24 engaging a similar annular projection 27 substantially in the center of each of the chambers 10', and thus each of said chambers is divided by said flanges 26 into two chamber parts P' and Q'. Each of the chamber parts Q' is also provided with an annular groove 28 forming an inlet thereto and located about the flanges 26. The bottom of the V grooves of the flanges 26 is preferably flattened, i. e., made cylindrical so that the clearance formed between the apex of the projection 27 and the cylindrical surface of the groove 24 is constant during the axial displacement of the gland within the extension 6'. Therefore, no matter what the clearance space $g'$ is the flow from the chamber part Q' into the chamber part P' cannot exceed a predetermined maximum, which is determined by the clearance between the apex of the projection 27 and the cylindrical surface of the groove 24. The thrust T' tends to eliminate the clearances $g'$ and $f'$ and to increase the clearance $g''$. The fluid from the high pressure source is discharged into the first chamber part Q' through the valve-controlled conduit 18', increasing the pressure therein. The fluid from the corresponding chamber part P' is carried through the valve-controlled conduit 22 to the consecutive chamber part Q', and the corresponding chamber part P' exhausts its fluid into the following chamber part Q', and again from its corresponding chamber part P' the same is exhausted through the valve-controlled outlet 19'. Thus, in all chamber parts P' the fluid pressure drops; and in all the chamber parts Q' the fluid pressure increases; therefore the thrust T'' increases, tending to force the gland so as to close the clearing spaces $g''$ and cut off the fluid supply to all chamber parts Q'. Such a displacement of the glands would increase the clearance spaces $f'$ and $g'$ and raise the fluid pressure of the chamber parts P' of the succeeding element. The equilibrium position, i. e., when T'=T'', may be adjusted by means of the valves 18', 20, 21 and 19'. The advantages of the V grooves in the periphery of the flanges 26 are, first, that the relative end position of rotor and stator determine the flow of fluid in the chamber part Q', and hence the amount of leakage; second, the limiting end positions are independent of the fluid pressure in the source communicating with the initial unit. Furthermore, the valve in the conduits can be eliminated, as the inflow to the chamber part Q' is controlled as described. Assuming the thrust T' to be zero, the pressure in the chamber part Q' will force the rotor back, thus opening the space $f'$. Fluid will enter the first chamber part P' from the stator casing 5' and increase the pressure in said chamber part provided the flow through $f'$ is greater than that through $g'$ and $g''$. In each of the successive units fluid will flow from Q' to P' through $f'$. In each unit the opening $f'$ is greater than the opening $g'$ and $g''$. Thus, fluid pressure in each chamber part P' will increase, and in each chamber part Q' will decrease. Between the first chamber part P' and the final chamber part Q' there will now be sets of chamber parts Q'—P' connected by passages $f'$. Since the flow through $f'$ is greater than that through $g'$ $g''$, each set will have the pressure in Q' decrease and that in P' increase until in each set the pressure is uniform. In each set the pressure acts on walls of equal area and, therefore, is balanced. In the final chamber part Q' the pressure is less than that in the initial chamber P', because there has been a drop in the pressure in each successive set. The pressure in the initial chamber part P' acts on the same area of the gland, and, therefore, has a total force greater than that in the final chamber part Q'. The thrust T'' will, therefore, vanish and in its place the thrust T' in opposite direction will arise. The rotor will now be forced back, thus opening the space $g''$ and closing the space $f'$. This surging action will continue until the position of equilibrium is found. The rate of flow through $g'$ may, as previously stated, be made less than that through $f'$ by the difference in the angularity of the bevel on the peripheries of the flanges 17 and 16 or by forming an incomplete v groove in the periphery of the flanges 26. If the method illustrated in Figs. 1 and 2 is used, the difference in angularity must be great enough to overcome the negative difference in circumferential dimension of said clearance space, that is, the clearance $f$ is so much greater than that of $g$ that the same axial displacement results in greater area of flow through $f$ than through $g$ in spite of the greater circumference of $g$.

It is evident that various changes may be made and modifications resorted to in the construction and arrangement of the parts described without departing from the spirit and scope of my invention; hence, I do not wish to limit myself to the exact construction shown.

Having thus described my invention, I claim as new and desire to secure by Letters Patent:

1. The combination of a fluid motor having a stator and a rotor with a thrust bearing and fluid seal combined, and comprising a chamber having a fluid inlet and a fluid outlet, a member within said chamber between the inlet and the outlet, and associated with the rotor, said member and chamber having means dividing said chamber into a plurality of parts adapted to intercommunicate at different levels, and independently controllable conduits connecting certain of said parts of said chamber together, substantially as and for the purpose set forth.

2. The combination of a fluid motor having a stator and a rotor with a thrust bearing and fluid seal combined, said thrust bearing comprising a fluid chamber forming an extension of the stator and having a fluid inlet and outlet, said chamber having means establishing communication with the stator and the atmosphere, a member within the chamber adapted to engage the means connecting said chamber with the stator, and the atmosphere, and tending to divide said chamber into separate parts, said parts adapted to communicate successively at different levers, and controllable conduits connecting certain of said parts, substantially as described.

3. The combination of a fluid motor having a stator and a rotor with a thrust bearing and fluid seal combined, said latter structure comprising a fluid chamber forming an extension of the stator communicating therewith and with the atmosphere; a member in said chamber controlling its communication with the atmosphere and the stator and dividing said chamber into parts adapted to communicate; a fluid inlet to some of the parts and a fluid outlet from the other of the parts, said member being associated with all the movements of the rotor and controlling the fluid pressure in said parts, whereby the thrust on the rotor within the stator is balanced.

4. The combination of a fluid motor having a stator and a rotor with a thrust bearing and fluid seal combined, the latter structure comprising a fluid chamber forming an extension of the stator communicating therewith and with the atmosphere, said chamber having means therein dividing it into communicating parts, a member in said chamber adapted to control the communication between the parts, stator and atmosphere, said member dividing said chamber into fluid chamber parts, of the two extreme fluid chamber parts one is adapted to communicate with the atmosphere and the other with the stator, and means establishing communication between certain fluid chamber parts, the said member being associated with the rotor and all its movements, substantially as and for the purpose set forth.

5. The combination of a fluid motor having a stator and a rotor with a thrust bearing and fluid seal combined, the latter structure comprising a fluid chamber forming an extension of the stator and having openings to the stator and to the atmosphere, and a member within said chamber carried by the rotor, said member dividing said chamber into parts adapted to communicate consecutively, means establishing communication between the parts spaced from each other by two other parts of the chamber, said member being adapted to participate in all the movements of the rotor, substantially as and for the purpose set forth.

6. The combination of a fluid motor having a stator and a rotor with a thrust bearing and fluid seal combined, said thrust bearing comprising a fluid chamber forming an extension of the stator and having means establishing communication with the stator and the atmosphere, and a member within the chamber adapted to control the connection of said chamber with the stator and the atmosphere, said member tending to divide said chamber into cells, each cell being divided into separate compartments, one of said compartments of each cell having a fluid inlet and the other a fluid outlet, these inlets and outlets being so joined that the outlet of one cell is the inlet to another cell spaced by compartments from the cell having said outlet.

7. The combination of a fluid motor having a stator and a rotor with a thrust bearing and fluid seal combined, the latter structure comprising a fluid chamber forming an extension from the stator adapted to communicate therewith and with the atmosphere, said chamber having a fluid inlet from the stator and a fluid outlet; a member within said chamber associated with the rotor and all its movements, said member being positioned between the fluid inlet and fluid outlet of said chamber and adapted to simultaneously control the flow of fluid from the inlet to the outlet of the chamber, from the stator into the chamber, and from the chamber into the atmosphere whereby such a difference in fluid pressure between the two parts is obtained that it balances the thrust on the rotor within the stator.

8. The combination of a fluid motor having a stator and a rotor with a thrust bearing and fluid seal combined, the latter structure comprising a fluid chamber forming an extension from the stator adapted to communicate therewith and with the atmosphere, said chamber having annular flanges dividing it into a plurality of parts, the alternate parts having a fluid inlet and the others a fluid outlet, a member in the chamber carried by the rotor adapted to control the communication of the chamber with the atmosphere and the stator and also to engage the annular flanges whereby it controls the communication between the parts of the chamber substantially as and for the purpose set forth.

9. The combination of a fluid motor having a stator and a rotor with a thrust bearing and fluid seal combined, the latter structure comprising a fluid chamber forming an extension of the stator connected therewith and with the atmosphere; a member in said chamber associated with the rotor and all its movements, said member dividing the said chamber into a plurality of parts, of which the alternate parts have a fluid inlet and the other parts, a fluid outlet, said member and chamber having co-acting means whereby the flow of fluid from the stator into the chamber and from the chamber into the atmosphere is controlled, and also the flow of fluid between the adjacent parts of said chamber whereby such a difference of fluid pressure in the successive parts is obtained that the pressure of the fluid in the chamber on said member balances the thrust on the rotor within the stator.

10. The combination of a fluid motor having a stator and a rotor with a thrust bearing and fluid seal combined, the latter structure comprising a fluid chamber forming an extension from the stator connected therewith and the atmosphere, said chamber having annular flanges dividing it into parts; a member in said chamber controlling the chamber's connection with the stator and the atmosphere, and having flanges engaging said annular flanges of the chamber, said chamber having fluid inlets into some parts and fluid outlet from the other parts, the axial displacement of said member within the chamber controlling the flow of fluid from the inlets to the outlets of the chamber and also the communication of the chamber with the stator and the atmosphere, thereby maintaining such a difference in fluid pressure between the two parts as to balance the thrust on the rotor within the stator.

11. The combination of a fluid motor having a stator and a rotor with a thrust bearing and fluid seal combined, the latter structure comprising a casing forming an extension from the stator, said casing having a fluid inlet and a fluid outlet, means in the chamber associated with the stator for controlling the fluid inlet chamber between the inlet and outlet, and adapted to divide said chamber into a plurality of parts adapted to communicate, said means controlling the communication between said parts, and means for adjusting the fluid flow into the parts of the chamber, substantially as and for the purpose described.

12. The combination of a fluid motor having a stator and a rotor with a thrust bearing and fluid seal combined, the latter structure comprising an extension from the stator forming a fluid chamber connected therewith and to the atmosphere, said chamber having annular flanges dividing it into parts; a member in said chamber controlling the chamber's connection with the stator and the atmosphere; flanges on said member each having a groove engaging an annular flange of the chamber, said chamber having a fluid inlet disposed about each of said flanges carried by the member whereby said flanges control the fluid inlet in said parts of the chamber, said chamber having a fluid outlet from the other parts, the axial displacement of said member within the chamber controlling the flow of fluid into said chamber between said parts, from said chamber into the atmosphere and from the stator into said chamber, thereby creating a difference in pressure in said parts of the chamber such and so directed as to create a pressure on said member balancing the thrust on the rotor within the stator.

13. The combination of a fluid motor having a stator and a rotor with a thrust bearing and fluid seal combined, the latter structure comprising a multicellular chamber forming an extension from the stator adapted to communicate therewith and with the atmosphere, said chamber having a fluid inlet and fluid outlet, and means for distributing the fluid pressure through the cells so that the magnitude of pressure variation decreases successively from the inlet to the outlet substantially for the purpose set forth.

14. The combination of a fluid motor having a stator and a rotor with a thrust bearing and fluid seal combined, the latter structure comprising a multicellular fluid chamber forming an extension from the stator and adapted to communicate therewith and with the atmosphere, said chamber having a fluid inlet and a fluid outlet, and means associated with the rotor controlling the communication between the cells, whereby the fluid pressure in the successive cells between the inlet and the outlet is gradually decreased substantially as and for the purpose set forth.

15. A fluid seal and thrust bearing having a stationary casing forming a chamber surrounding a shaft whose thrust is to be balanced, a member within the chamber fixed to the shaft, tending to divide said chamber into cells, means on said member for dividing each cell into two compartments, one of said compartments of each cell having a fluid inlet and the other a fluid outlet, these inlets and outlets being so joined that the outlet from one cell is the inlet to another cell spaced by two compartments from the compartment of which the outlet forms the inlet to said compartment, and whereby in each cell the inlet compartment contains fluid under higher pressure than the other compartments.

In testimony whereof I have signed my name to this specification in the presence of two subscribing witnesses.

WALTER JACOB WOHLENBERG.

Witnesses:
 FRED G. COFFUN,
 HENRY T. SCHUMACHER.